United States Patent
Ginther et al.

(10) Patent No.: US 11,518,376 B2
(45) Date of Patent: Dec. 6, 2022

(54) SADDLE-RIDE VEHICLE WITH AUTONOMOUS BRAKING AND METHOD OF OPERATING SAME

(71) Applicant: Harley-Davidson Motor Company Group, LLC, Milwaukee, WI (US)

(72) Inventors: Brian Ginther, Pewaukee, WI (US); Cindy Ann Miller, Delafield, WI (US); Matthew David Rasmussen, Muskego, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 289 days.

(21) Appl. No.: 17/061,855

(22) Filed: Oct. 2, 2020

(65) Prior Publication Data
US 2021/0016771 A1 Jan. 21, 2021

Related U.S. Application Data (63) Continuation of application No. 16/033,524, filed on Jul. 12, 2018, now Pat. No. 10,793,146, which is a
(Continued)

(51) Int. Cl.
*B60W 30/09* (2012.01)
*B60W 10/18* (2012.01)
(Continued)

(52) U.S. Cl.
CPC .............. *B60W 30/09* (2013.01); *B60T 7/12* (2013.01); *B60W 10/02* (2013.01); *B60W 10/04* (2013.01);
(Continued)

(58) Field of Classification Search
CPC ...... B60W 30/09; B60W 10/02; B60W 10/04; B60W 10/18; B60W 30/095; B60W 40/08;
(Continued)

(56) References Cited

U.S. PATENT DOCUMENTS 10,029,683 B1 7/2018 Ginther et al.
10,793,146 B2 10/2020 Ginther et al.
(Continued)

FOREIGN PATENT DOCUMENTS

CN 203005338 U 6/2013
CN 104648569 A 5/2015
(Continued)

OTHER PUBLICATIONS

Autoblog, "Why is My Car Telling Me to Get Coffee," article (2011) 2 pages, http://www.autoblog.com/2011/10/04/mercedes-benz-driving-drowsy/.
(Continued)

*Primary Examiner* — Basil T. Jos
(74) *Attorney, Agent, or Firm* — Michael Best & Friedrich LLP (57) ABSTRACT

A saddle-ride vehicle includes a forward travel sensor a brake that decelerates the vehicle by actuation of a rider-operable brake control. A controller identifies a trigger for an autonomous braking event for the brake. A rider sensor system is in electrical communication with the controller and includes one or both of: a rider cognition sensor operable to detect parameters of rider cognition and report rider cognition status to the controller, and a rider physical sensor operable to detect parameters of a physical engagement between a rider and the vehicle and report rider physical engagement status to the controller. The controller is programmed to perform one or both of the following in response to the identification of the autonomous braking event trigger: checking for a positive cognitive engagement of the rider with the rider cognition sensor, and checking for a positive physical engagement of the rider with the rider physical sensor.

23 Claims, 4 Drawing Sheets

Related U.S. Application Data continuation of application No. 15/415,107, filed on Jan. 25, 2017, now Pat. No. 10,029,683.

(51) Int. Cl.

| | | |
|---|---|---|
| *B60W 10/04* | (2006.01) | |
| *B60W 40/08* | (2012.01) | |
| *B60W 50/16* | (2020.01) | |
| *B60W 10/02* | (2006.01) | |
| *B60T 7/12* | (2006.01) | |
| *B60W 50/14* | (2020.01) | |
| *B60W 30/095* | (2012.01) | |
| *G06V 20/59* | (2022.01) | |

(52) U.S. Cl.
CPC .......... *B60W 10/18* (2013.01); *B60W 30/095* (2013.01); *B60W 40/08* (2013.01); *B60W 50/14* (2013.01); *B60W 50/16* (2013.01); *B60W 2050/143* (2013.01); *B60W 2050/146* (2013.01); *B60W 2300/36* (2013.01); *B60W 2420/42* (2013.01); *B60W 2420/52* (2013.01); *G06V 20/597* (2022.01)

(58) Field of Classification Search
CPC ................. B60W 50/14; B60W 50/16; B60W 2050/143; B60W 2050/146; B60W 2300/36; B60W 2420/42; B60W 2420/52; B60T 7/12; G06V 20/597
See application file for complete search history.

(56) References Cited

U.S. PATENT DOCUMENTS

| | | |
|---|---|---|
| 2012/0212353 A1 | 8/2012 | Fung et al. |
| 2013/0024075 A1 | 1/2013 | Zagorski et al. |
| 2016/0358453 A1 | 12/2016 | Wassef et al. |
| 2017/0028971 A1* | 2/2017 | Kajiyama ............. B60T 8/3225 |
| 2017/0028972 A1 | 2/2017 | Kajiyama et al. |

FOREIGN PATENT DOCUMENTS

| | | |
|---|---|---|
| CN | 103171534 B | 1/2016 |
| CN | 205381339 U | 7/2016 |
| DE | 102008007714 A1 | 9/2008 |
| JP | 2016071687 A | 5/2016 |

OTHER PUBLICATIONS

Avant, "Automatic Braking Systems on Motorcycles, Do We Need Them?," article (2014) 5 pages, https://rideapart.com/articles/automatic-braking-systems-mandatory-motorcycles.

Honda, "Honda Riding Assist Motorcycle Wins Three Awards at CES 2017," article (2017) 1 page, http://world.honda.com/news/2017/c170109eng.html.

Nissan, "Nissan's "Driver Attention Alert" helps detect erratic driving caused by drowsiness and inattention," article (2015) 2 pages, http://nissannews.com/en-US/nissan/usa/releases/nissan-s-driver-attention-alert-helps-detcht-erratic-driving.

Notice of Reasons for Rejection issued from the Japan Patent Office for related Application No. 2017-139620 dated Oct. 23, 2019 (8 Pages including English Translation).

\* cited by examiner

SADDLE-RIDE VEHICLE WITH AUTONOMOUS BRAKING AND METHOD OF OPERATING SAME

CROSS-REFERENCE TO RELATED APPLICATIONS

This application is a continuation of U.S. patent application Ser. No. 16/033,524, filed Jul. 12, 2018, which is a continuation of U.S. patent application Ser. No. 15/415,107, filed Jan. 25, 2017, the entire contents of both of which are incorporated by reference herein.

BACKGROUND

The present disclosure relates to saddle-ride vehicles, and more particularly, relates to advanced driver assistance systems (ADAS) for such vehicles.

SUMMARY

In one aspect, the invention provides a saddle-ride vehicle operable by a rider situated upon the saddle-ride vehicle. The saddle-ride vehicle includes a brake configured to decelerate the vehicle in response to actuation of a rider-operable brake control and at least one forward travel sensor. A controller is programmed to identify a trigger for an autonomous braking event using the brake. A rider sensor system is in electrical communication with the controller and includes one or both of: a rider cognition sensor operable to detect parameters of rider cognition and to report rider cognition status to the controller, and a rider physical sensor operable to detect parameters of a physical engagement between a rider and the vehicle and to report rider physical engagement status to the controller. The controller is programmed to perform one or both of the following in response to the identification of the autonomous braking event trigger: check for a positive cognitive engagement of the rider with the rider cognition sensor, and check for a positive physical engagement of the rider with the rider physical sensor.

In another aspect, the invention provides a method of controlling autonomous actuation of a brake on a saddle-ride vehicle. A trigger for an autonomous braking event for the brake is identified with a controller. In response to the identification of the autonomous braking event trigger, one or both of the following are performed with the controller: checking for a positive cognitive engagement of the rider with a rider cognition sensor, and checking for a positive physical engagement of the rider with a rider physical sensor.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
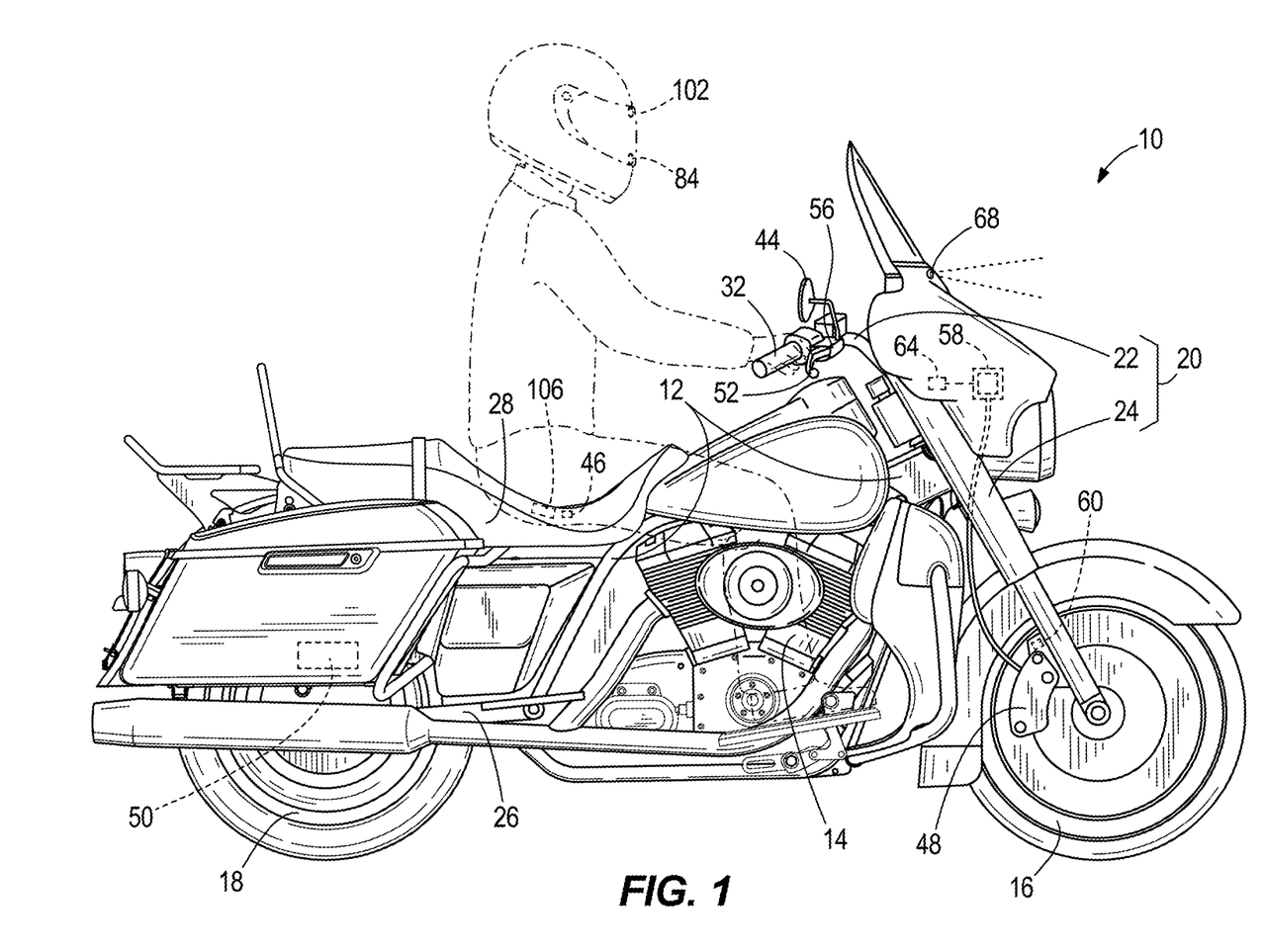
FIG. 1 is a side view of a motorcycle according to one embodiment of the invention.

FIG. 1 illustrates a motorcycle 10 that includes a frame 12, an engine 14, a single front wheel 16, and at least one rear wheel 18 positioned rearward of the front wheel 16. The front wheel 16 is supported by a steering unit 20 including a handlebar 22 and a front fork 24. The rear wheel 18 is supported pivotably relative to the frame 12 by a swing arm 26. A seat 28 of the motorcycle 10 supports a rider, and optionally a pillion passenger, in a saddle configuration such that the rider's and/or passenger's legs straddle the outside of the motorcycle 10. While the seat 28 may optionally have a fixed or detachable backrest, the seat 28 is arranged for supporting the rider and passenger on the motorcycle 10, and is not arranged for supporting persons within the vehicle, such as within an enclosed cabin. Thus, the motorcycle 10 is a saddle-ride or sit-on vehicle, in contrast to an automobile or other sit-in vehicle. As with most types of saddle-ride vehicles, the rider's operating space on the motorcycle 10 is exposed to the outside environment and may be provided without any seatbelts or similar restraints. The rider of the motorcycle 10 is responsible for holding onto the handlebar 22 to maintain control of the motorcycle 10. Although the motorcycle 10 can be provided in a self-stable trike configuration in other constructions, the motorcycle 10 is illustrated as a non-self-stable single track vehicle that requires the rider to maintain a stable upright riding configuration to avoid the motorcycle 10 tipping over.

Figure 2:
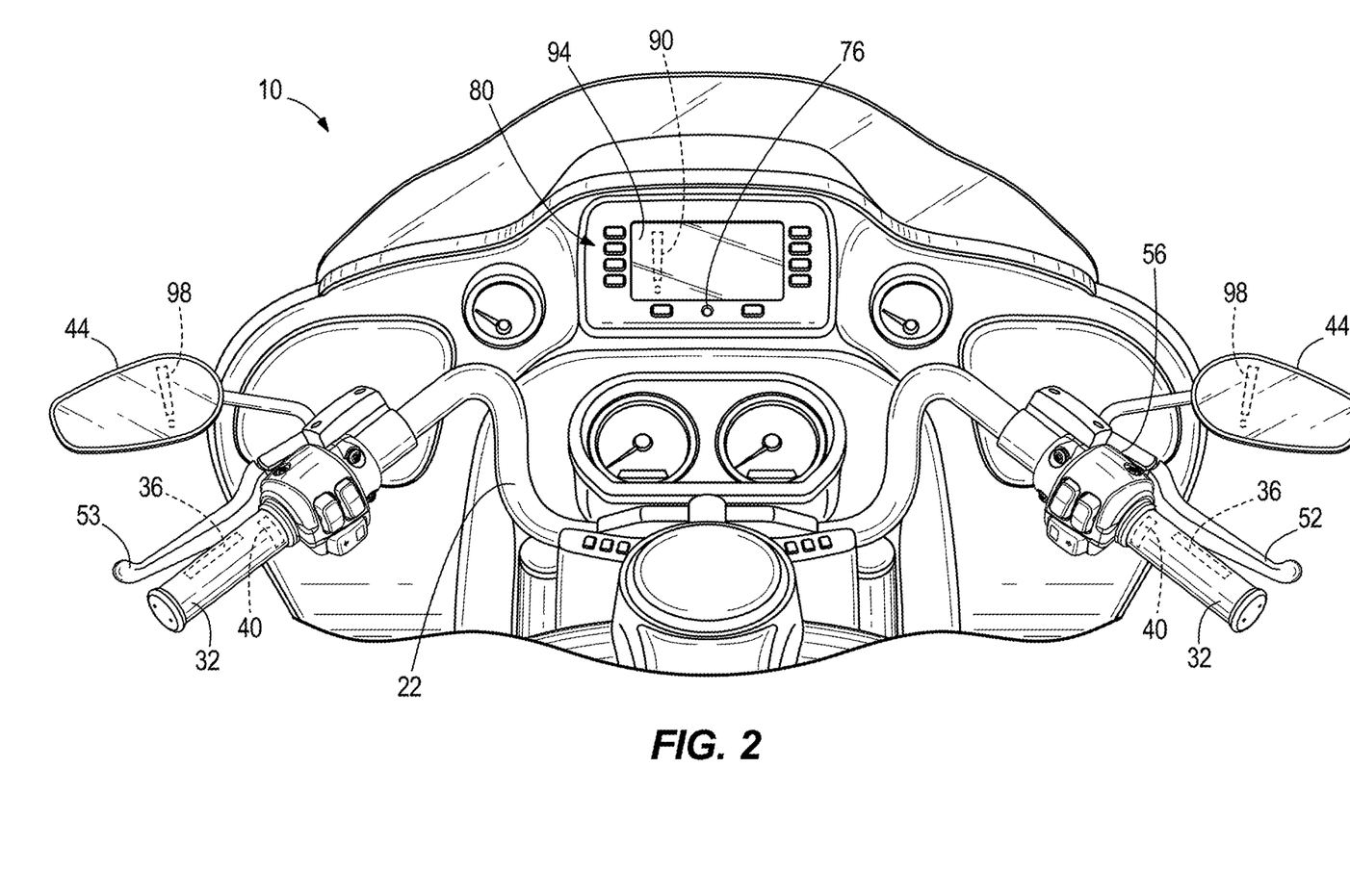
FIG. 2 is a rider's perspective view of the motorcycle of FIG. 1.

In order to allow the rider (shown in phantom in FIG. 1) to have steering control of the front fork 24 and the front wheel 16, a pair of hand grips 32 are provided at the distal ends of the handlebar 22. It is also noted that the handlebar 22 can be a single unitary element or an assembly of individual elements that allow motion to be transferred from the hand grips 32 to the front fork 24. As shown in FIG. 2, each of the hand grips 32 includes a hand grip sensor 36 operable to detect the presence of the rider's hand on the respective hand grip 32. The hand grip sensors 36 can include proximity switches and/or capacitive sensors, for example. In some constructions, the hand grip sensors 36 can operate to not only detect the presence of the rider's hands, but a pressure applied to the hand grips 32 by the rider's hands. For example, the hand grip sensors 36 can include pressure transducers. Additionally, for reasons described in further detail below, each hand grip 32 can include a haptic indicator 40 operable to output a tactile sensory vibration calibrated to be noticeable to the rider during riding. At or near the distal ends of the handlebar 22, the motorcycle 10 also includes a respective pair of side mirrors 44.

The hand grip sensors 36 are one example of a rider physical sensor operable to physically detect the rider at one of the designated touch points between the rider and the motorcycle 10. The hand grip sensors 36 and/or other rider physical sensors can be part of a rider sensor system of the motorcycle 10. Another example of a rider physical sensor is a seat sensor 46 located within the seat 28 as shown in FIG. 1. The seat sensor 46 can be a weight sensor such as a switch, or a load cell operable to detect a rider's weight that is exerted upon the seat 28. The seat sensor 46 can output a signal indicative of the rider's weight exerted upon the seat 28 for determining whether the rider is in a seated position (i.e., not standing up on foot supports of the motorcycle 10). The signal from the seat sensor 46 can be representative of the actual weight exerted or can simply be a binary output if the seat sensor 46 is a switch configured to close when a predetermined amount of weight (e.g., 30 lbs. or 50 lbs.) is being exerted on the seat 28.

Returning to FIG. 1, a braking system of the motorcycle 10 includes a front brake 48 and a rear brake 50 operable to apply deceleration torque to the front and rear wheels 16, 18, respectively. In some constructions, the front brake 48 and the rear brake 50 are or include friction brakes 48 actuated by selectively applied hydraulic fluid pressure. As shown, a brake control lever 52 can be provided proximate the right hand grip 32. The brake control lever 52 can be movable by grip pressure of the rider's hand to operate a brake actuator 56 such as a master cylinder to apply hydraulic fluid pressure to at least the front brake 48, and in some cases both brakes. The braking system of the motorcycle 10 can further include a hydraulic unit (not shown) separate from the master cylinder. The hydraulic unit can have an additional brake actuator(s), including a hydraulic actuator 58 such as a pump, a motor-driven plunger, or a high pressure fluid accumulator. For example, at least the front brake 48 of the motorcycle 10 can be selectively coupled to the hydraulic actuator 58 to receive hydraulic fluid pressure therefrom, in response to the actuation of the brake control lever 52 and/or autonomously as discussed further below. The motorcycle 10 can have additional rider-operable brake controls such as a foot lever normally connected to the rear brake 50. Although the remainder of the description focuses on the actuation of the front brake 48 as an example, the rear brake 50 can also be actuated in accordance with the description below. The braking system of the motorcycle 10 can be equipped with an anti-lock braking system (ABS) that is operable to monitor wheel speeds via one or more wheel speed sensors 60 (FIG. 1) and selectively relieve applied hydraulic pressure at the brake(s) 48, 50 to avoid the tire skidding on the road surface (referred to as wheel "lock-up"). In other words, ABS is operable to maintain brake force at the wheel lock-up threshold.

Figure 3:
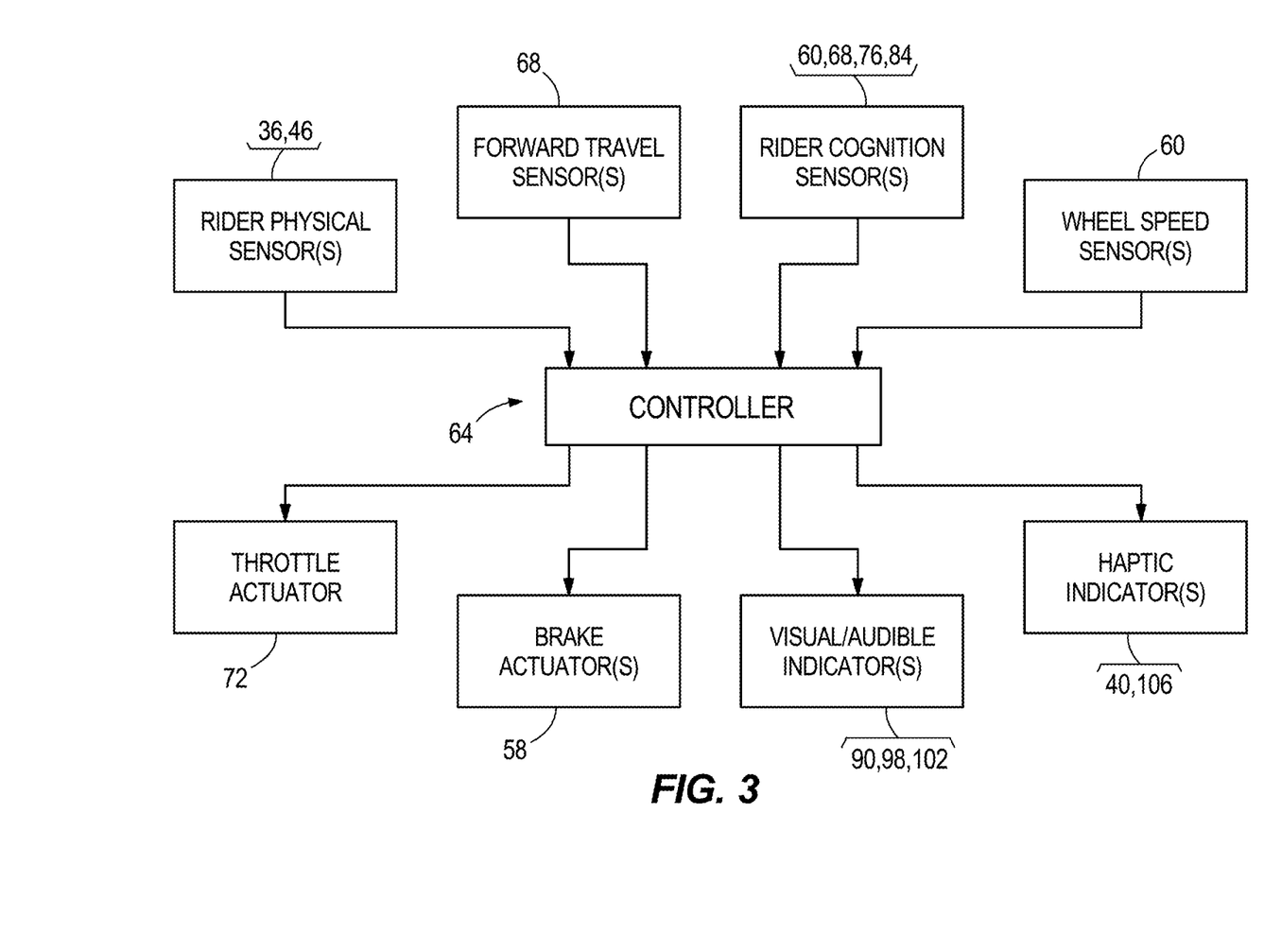
FIG. 3 is a schematic diagram illustrating a variety of sensor inputs to and component outputs from a controller of the motorcycle of FIGS. 1 and 2.

Although the normal operation of the braking system of the motorcycle 10 can be entirely rider-controlled, the motorcycle 10 is also equipped to carry out autonomous braking under the direction of an electronic controller 64. Autonomous braking events can be triggered by any one or more of a vast array of controller-identified conditions, including emergency and non-emergency conditions as discussed further below. The controller 64 can be a microprocessor and is operable to monitor a plurality of input signals from input devices or sensors, and can be operably in control of a plurality of output devices or actuators via output signals. At least some of the input and output devices are illustrated schematically in FIG. 3. One such type of input device to the controller 64 is one or more forward travel sensors 68. The forward travel sensor 68 can be a forward-facing sensor including any or all of: a camera, a RADAR sensor, or a LIDAR sensor. The one or more forward travel sensors 68 are operable to detect a detrimental riding situation in the motorcycle's travel path (e.g., a vehicle, animal, or other object, or various road-based hazards such as potholes or bridge grates within a predetermined range of the motorcycle's forward travel path) and output a corresponding signal to the controller 64. The one or more forward travel sensors 68 can further be operable to detect a size or type of the object and a travel path, if any, of the object or road-based hazard with respect to the motorcycle's forward travel path to determine whether a collision between the object and the motorcycle 10 is imminent or whether the motorcycle 10 is predicted to encounter the road-based hazard. These and others can serve as triggers for autonomous braking events, as identified by the controller 64. The forward travel sensor(s) 68 can be operable continuously during motorcycle operation, or at least above a threshold forward travel speed.

Under certain qualifying conditions, the controller 64 is operable to carry out an autonomous braking event of the motorcycle 10 upon the identification of one or more triggers. In one non-limiting example, the trigger can be identified based at least partially on receiving a first signal from the forward travel sensor(s) 68 that detects an obstructive object in the motorcycle's travel path. In an autonomous braking event, the brake 48 is actuated by a supply of pressurized hydraulic fluid from the hydraulic actuator 58 without actuation of the brake control lever 52 by the rider, or auxiliary to a rider-provided actuation of the brake control lever 52. The autonomous braking event, once actuated, can engage ABS to maximize deceleration rate to bring the motorcycle 10 to a complete stop to either avoid a collision with the obstruction or drastically reduce the collision impact. Concurrent with an autonomous braking event, the controller 64 can also send a signal to a throttle actuator 72 (FIG. 3) of the engine 14 to close the throttle. Furthermore, simultaneous with or following the throttle closure, the controller 64 can also send a signal to a clutch actuator (not shown) to operate the clutch and disengage the mechanical connection between the engine 14 and the rear wheel 18 to avoid the engine running speed from directly influencing the rotational speed of the rear wheel 18. Similarly, the controller 64 may be programmed to automatically energize the clutch actuator when the rider himself/herself initiates an emergency braking event (i.e., one that is identified to be at or near the engagement of ABS) since the rider may fail to actuate the clutch by the hand-operated clutch lever 53 (FIG. 2) in a moment of panic. It is noted that, beyond collision avoidance or other detrimental riding situations, other types of autonomous braking triggers are identifiable by the controller 64 to selectively effectuate autonomous braking based on enhanced perception and augmented sensory information provided to the controller 64 as discussed further below. Although a portion of the application is further described in terms of a collision avoidance method in response to imminent collision detection, other variations are described below and these can be combined or exchanged in any combination based on the capabilities of the given motorcycle or the riding scenarios encountered.

Because the motorcycle 10 is a saddle-ride vehicle that does not contain or restrain the rider, autonomous braking events may be carried out only after checking for, and optionally only after positive confirmation of, the rider being in a ready-state. In other circumstances, the controller 64 may disable autonomous braking or disregard an identified trigger for autonomous braking. The ready-state can refer to one or both of physical readiness, such as the rider's hands actively gripping the hand grips 32, and mental or cognitive readiness. Thus, the motorcycle 10 includes a rider sensor system including various sensors for monitoring the rider, along with an indicator system including one or more indicators for alerting the rider.

As shown in FIG. 2, the rider sensor system of the motorcycle 10 includes at least one rider cognition sensor 76 operable to detect at least one parameter corresponding to a state of cognitive engagement of the rider and providing a signal indicative of the same to the controller 64. The rider cognition sensor 76 can be a camera operable with the controller 64 to perform facial recognition and interpretation, and/or identifying and tracking the rider's eyes. Thus, the rider cognition sensor 76 can collect data indicative of where the rider is looking and/or whether the rider's eyes are open and looking up at the forward travel path. The rider cognition sensor 76 is shown as a rider-facing sensor positioned in an instrument panel 80 of the motorcycle 10. In other constructions, more than one rider cognition sensor 76 is provided at one or more locations, which may not be limited to the instrument panel 80. In some constructions, a helmet-based rider cognition sensor 84 can be provided in or on a helmet worn on the rider's head. The helmet-based rider cognition sensor 84 can be inconspicuous and operable to look at the face and/or eyes of the rider to operate similar to the rider cognition sensor 76 discussed above. The helmet-based rider cognition sensor 84 can communicate wirelessly with the controller 64, or a wired connection can be provided between the helmet and the motorcycle 10. In addition, one or more of the forward travel sensor(s) 68 may operate as a rider cognition sensor by collecting data about the rider's performance in relation to maintaining a consistent position within a traffic lane. In addition, the controller 64 may consult speed data from the wheel speed sensor 60 (or on-board GPS sensor) to provide data on rider cognition by way of the rider's ability to maintain a constant speed while cruising. Thus, the controller 64 can have a relatively complex rider cognition module that includes a plurality of inputs to execute an algorithm to ultimately make a pass/fail determination on whether the rider is cognitively engaged sufficiently to cope with an autonomous braking event in the event that the controller 64 identifies an autonomous braking event trigger (e.g., from the forward travel sensor(s) 68 that a collision is imminent).

One or more indicators can be provided on the motorcycle and/or the rider's helmet to alert the rider regarding one or more alert conditions. A first visual indicator 90 can be provided on a display screen 94 in the instrument panel 80. The first visual indicator 90, illustrated as a "!" symbol in FIG. 2, can be illuminated and may flash. Similar visual indicators 98 can be provided in each side mirror 44. It is noted that the "!" symbol is merely one example, and various symbols, lights, or other types of visual indicators can be used. Further visual indicators can be provided at other locations on the motorcycle 10, preferably situated to provide highly conspicuous visual notification to the rider during travel. In some constructions, one or more additional indicators 102 operable to provide one or both of auditory and visual output (e.g., a display or light and/or a speaker) are positioned in or on the rider's helmet. Alternatively or in addition, the rider can be alerted with haptic indicators such as the haptic indicators 40 located in the hand grips 32 and/or additional haptic indicators at other touch points between the rider and the motorcycle 10, such as a haptic indicator 106 located in the seat 28. Any or all of the visual and haptic indicators can be actuated by the controller 64 to alert the rider in any or all of the following scenarios, which represent enhanced perception and augmented sensory information:

A. Upon identification of an autonomous braking event trigger;
   a. Imminent collision,
   b. Travel speed too fast for upcoming turn,
   c. Road hazard (e.g., pothole, bridge grate),
   d. Low light conditions,
   e. Vehicle-to-Vehicle or Vehicle-to-Infrastructure (e.g., shared GPS data regarding low traction road surface, weather/environmental conditions, traffic conditions, accidents, police traps, and/or blocked roads);

B. Upon detection that the rider is not gripping both hand grips and/or not seated;

C. Upon detection that the rider does not pass a cognitive test;
   a. Rider not facing/looking forward,
   b. Rider's eyes fully or partially closed,
   c. Rider's eyelids moving slowly,
   d. Rider yawning behavior,
   e. Rider not maintaining lane position,
   f. Rider not maintaining consistent speed.

Figure 4:
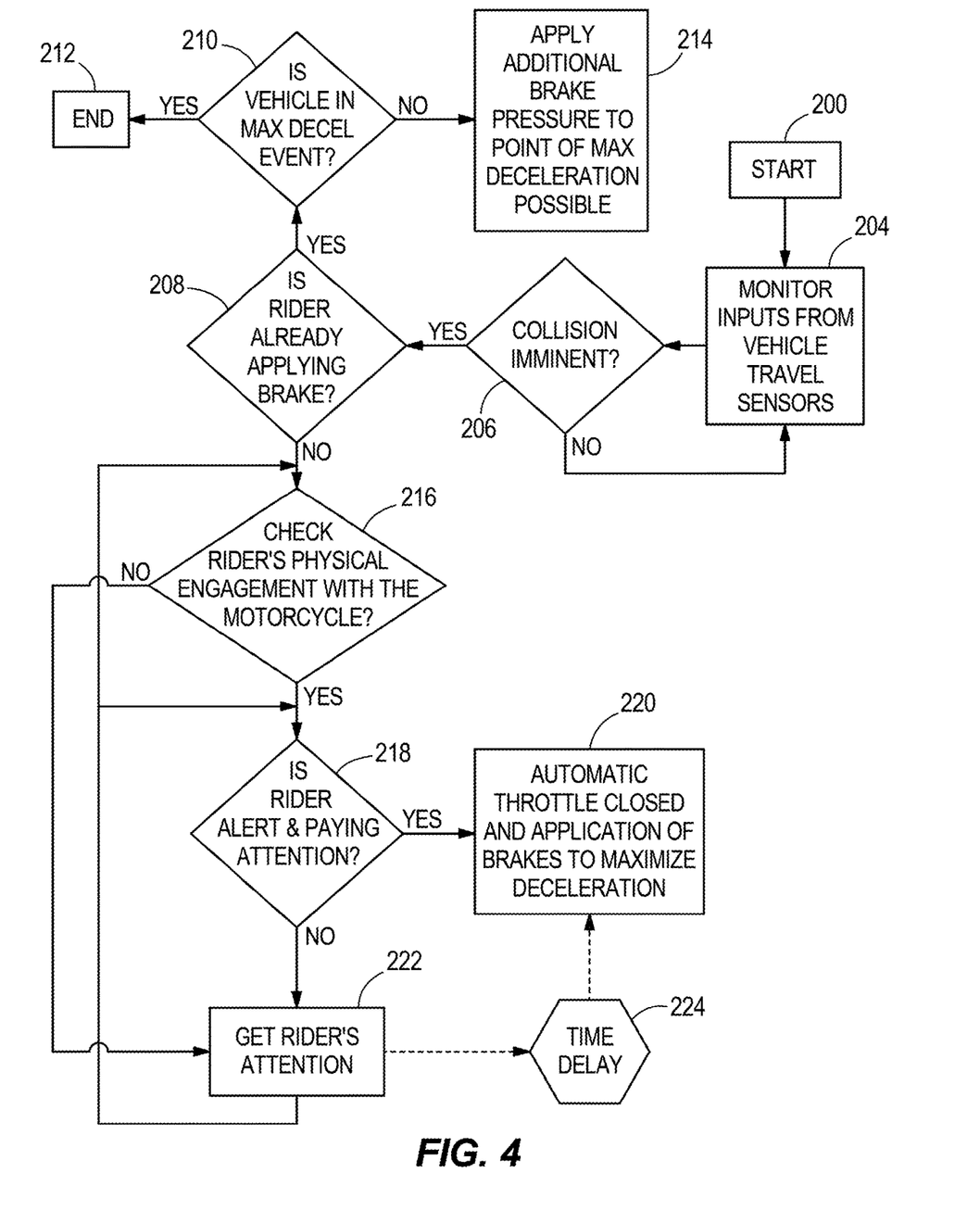
FIG. 4 is a flow diagram illustrating a controller algorithm for autonomous braking of the motorcycle of FIGS. 1 and 2.

Further operation of the controller 64 and an exemplary method of operating the motorcycle 10 and its braking system for maximized autonomous braking in a collision avoidance routine are described below with primary reference to FIG. 4. Though certain aspects of this particular method are specific to collision avoidance, this merely serves as one exemplary embodiment. The method starts at box 200, which can be upon start-up of the motorcycle's ignition or another prescribed operational condition, such as surpassing a threshold forward travel speed. After start-up, the method proceeds to box 204 where inputs from vehicle travel sensors (e.g., forward travel sensor(s) 68 and wheel speed sensor 60) are monitored by the controller 64. At step 206, the controller 64 determines whether a front end collision is imminent (i.e., collision with an obstruction is predicted on the current vehicle travel path at current vehicle travel speed) based on the inputs analyzed at step 204. If no front end collision is imminent, the method returns to step 204 in a cycle of continuous or periodic monitoring. If a collision is imminent as determined at step 206, this provides a trigger for an autonomous braking event, and the method proceeds to step 208 where it is determined whether the rider is already applying the brakes. This can be determined from one or more conventional sensors of the braking system, such as a brake switch operable to detect actuation of the brake control lever 52. If the rider is applying the brakes at step 208, the controller 64 then determines at step 210 whether the motorcycle 10 is in a maximum deceleration event (e.g., whether ABS has been triggered at one or both wheels 16, 18). If maximum deceleration is already being achieved through rider-applied braking, the controller 64 disregards the autonomous braking trigger—the method ends at box 212 and no further intervention is made. If the controller 64 determines that the rider is applying some braking, but less than maximum possible deceleration, the controller 64 (at method step 214) autonomously applies additional brake pressure to put the braking system into ABS operation for maximum deceleration.

If it is determined at step 208 that the rider is not already applying the brakes, the controller 64 proceeds to perform one or more checks with the sensor(s) of the rider sensor system. At step 216, the controller 64 checks the rider's physical engagement with the motorcycle 10. This can include determining whether the rider's two hands are positioned on the hand grips 32. As described above, this determination can be made by using the hand grip sensors 36 to confirm that both of the rider's hands are positioned on the hand grips 32. In some constructions, the determination at step 216 may require a minimum threshold grip pressure to be exerted by the rider's hands upon the hand grips 32 to result in a positive check. Optionally, the check at step 216 can also require detection of the rider being seated on the seat 28. This can include determining whether a weight above a minimum threshold is exerted upon the seat 28 to result in a positive check. If the controller 64 determines at step 216 that the rider is not adequately physically engaged with the motorcycle 10 (e.g., rider's hands are not adequately engaged with both hand grips 32 and/or rider is not seated), the method proceeds to step 222 where one or more of the indicators 40, 90, 98, 102, 106 are triggered to get the rider's attention. The alerts triggered at step 222 may operate continuously, and the method can return to step 216 to re-check for correct rider position before taking any further action.

Once the controller 64 determines that the rider is positively physically engaged with the motorcycle 10 at step 216, the method proceeds to step 218 where it must be determined whether the rider is alert and paying attention. In other words, the controller 64 performs or acts upon a cognitive analysis of the rider. This can involve interpreting signals output from sensors including, for example, the rider cognition sensor 76 and/or the helmet-based rider cognition sensor 84. As discussed above, one or more of the cognition sensors 76, 84 can provide data (e.g., tracking the eye pupil, facial recognition) regarding the direction and/or state of the rider's face and eyes, among other things as discussed above. Further, the determination at step 218 can involve interpretation of data from additional sensors such as the forward travel sensor(s) 68 and/or the wheel speed sensor 60 regarding the rider's control of the motorcycle 10 immediately prior to the detection of the imminent collision at step 206 (e.g., data collected at step 204). In some constructions, it may even be determined by the controller 64 directly at step 204 that the rider's cognitive engagement is not adequate for autonomous braking (e.g., inconsistent speed and/or lane position, rider identified as drowsy from eye tracking data, identified yawning patterns, etc.), such that the controller 64 may disable all or part of the routine that attempts to identify an imminent front end collision and selectively apply autonomous braking. In some constructions, the analysis of step 218 is carried out simultaneously or parallel with the check at step 216, rather than sequentially thereafter. In an alternative method, the routine of FIG. 4 may include only one of the steps 216, 218.

If at step 218, the rider is found to have sufficient cognitive engagement in the riding activity, i.e., the rider is determined to be vigilant, the method proceeds to step 220 where the controller 64 sends a signal to the throttle actuator 72 to automatically close the engine throttle (e.g., an override of a rider-input throttle position) and to automatically engage a brake actuator (e.g., brake actuator 56 or other without any required input from the rider) to actuate the brake 48 to achieve maximum deceleration (e.g., to engage ABS). If the rider is determined not to have sufficient cognitive engagement at step 218, the method proceeds to step 222 where one or more of the indicators 40, 90, 98, 102, 106 are actuated to alert the rider in a manner similar to that described above when the rider's hands are found to not be engaged with the hand grips 32. The alerts triggered at step 222 may operate continuously, and the method can return to step 216 (or directly to step 218) to re-check for one or more of the prerequisites for autonomous emergency braking before taking any further action. Thus, in this construction, the method carried out by the controller 64 will operate to treat positive confirmation at steps 216 and 218 as absolute prerequisites and will in fact disregard the identified autonomous braking trigger and block the actuation of autonomous braking in spite of a determination of imminent front end collision at step 206 if one or both of the prerequisites of steps 216, 218 are not met.

It is also noted that, in the interest of getting the rider's attention at step 222, subsequent to a "yes" result at step 206, the controller 64 may also trigger one or both of: actuating a momentary pulse of the brake 48 or momentarily interrupting the delivery of drive power (e.g., throttle reduction, fuel and/or spark interruption to the engine 14). In other constructions, the momentary brake pulse and/or drive power interruption can be triggered by the controller 64 immediately in response to the identification of the autonomous braking event trigger such as detection of imminent front end collision at step 206. The momentary brake pulse and/or drive power interruption can provide haptic indication to the rider by a small but perceptible pitching forward motion, but neither is operable to be significant enough in amount or duration to remedy the adverse riding situation or other condition serving as an autonomous braking event trigger.

In a variation of the method described above and illustrated by dashed lines in FIG. 4, the controller 64 does not receive positive confirmation at one of the steps 216, 218, and following the actuation of the indicator(s) 40, 90, 98, 102, 106 to alert the rider, the controller 64 may proceed to step 220 to actuate autonomous braking after a brief time delay at step 224 of a predetermined time interval (e.g. 200 ms to 500 ms). In lieu of the time delay scheme or in combination therewith, the controller 64 may proceed to a modified step 220 in which the engine throttle is closed and optionally a predetermined autonomous actuation of the brake 48 is applied to achieve an amount of deceleration distinctly below the ABS threshold. The autonomous braking in this scenario can be a fraction of the maximum available deceleration achievable with ABS engagement (e.g., a target deceleration rate such as 0.4G) to at least reduce the severity of the front end collision.

Separate from or in combination with collision avoidance methodology as discussed above with reference to FIG. 4, the controller 64 can also carry out methods of actuating autonomous braking in response to other identified autonomous braking event triggers. For example, the controller 64 may identify an intended travel path on a roadway (e.g., identifying the rider's intent to make a turn, either along a winding road or from one road onto another road) and further identify that the current travel speed is excessive and is not predicted to allow the rider to achieve the desired travel path. This determination can further take into consideration known lean angle limitations of the motorcycle 10 and/or predetermined values for predicted tire grip. In other situations, the controller 64 may identify that the rider is conducting the motorcycle 10 through an evasive maneuver to avoid an object such as another vehicle. In yet other situations, the controller 64 may identify a trigger for an autonomous braking event based on a location-specific hazard or condition reported wirelessly to the controller 64 (from another vehicle or application service that is operable to report notifications of roadway or environmental conditions with GPS location data) or detected by the forward travel sensor(s) 68. A non-limiting example of such an application service that operates remotely from the motorcycle 10 is WAZE™. In some or all of these non-collision type adverse situations, the autonomous braking by the controller 64 may be applied as a calculated amount according to the desired travel outcome, rather than full braking power to engage ABS. Thus, step 220 may be modified accordingly, or another step of calculating a braking amount can be added immediately following step 206 or immediately prior to step 220. It is also noted that the controller 64 may actuate autonomous braking according to individual or any combination of adverse situations and may be adaptive to changing situations.

Thus, the motorcycle 10 is capable of providing autonomous braking in response to identification of any number of various triggering conditions as a means for providing advanced assistance to the rider operating the motorcycle 10. However, the motorcycle 10 is controlled such that an autonomous braking event trigger may be effectively disabled or disregarded based on the rider's cognitive and/or physical engagement. Thus, despite positively identifying a trigger condition that could be aided by autonomous braking, the controller 64 is programmed so as to limit the actual implementation of the autonomous braking to times when the rider is judged to be capable of managing the consequences and maintaining control of the motorcycle 10 throughout the actual autonomous braking event. Although positive physical and/or cognitive engagement may be considered a prerequisite for autonomous braking according to aspects of the invention, this does not apply to an autonomous brake pulse that is momentary and used only as a haptic indicator or alert to the rider as described above.

Various features and advantages of the disclosure are set forth in the following claims.

What is claimed is:

1. A saddle-ride vehicle operable by a rider situated upon the saddle-ride vehicle, the saddle-ride vehicle comprising:
   a brake configured to decelerate the vehicle in response to actuation of a rider-operable brake control;
   a controller programmed to identify a trigger for an autonomous braking event using the brake; and
   a rider sensor system in electrical communication with the controller, the rider sensor system including one or both of: a rider cognition sensor operable to detect parameters of rider cognition and to report rider cognition status to the controller, and a rider physical sensor operable to detect parameters of a physical engagement between a rider and the vehicle and to report rider physical engagement status to the controller,
   wherein, on the condition of the controller determining from the rider sensor system that there is positive rider engagement, the controller is programmed to instruct a first level of autonomous actuation of the brake in response to identification of the autonomous braking event trigger, and
   wherein, in the absence of the controller determining from the rider sensor system that there is positive rider engagement, the controller is programmed to retard or disable the instruction of the first level of autonomous actuation of the brake in response to identification of the autonomous braking event trigger.

2. The saddle-ride vehicle of claim 1, wherein the controller is programmed to determine from the rider sensor system whether there is a positive rider engagement in response to the identification of the autonomous braking event trigger.

3. The saddle-ride vehicle of claim 1, further comprising a pair of hand grips supported on a handlebar operably coupled to a front wheel fork of the saddle-ride vehicle, wherein the rider physical sensor comprises a pair of hand grip sensors operable to detect whether the rider's two hands are on the pair of hand grips, and wherein the controller is programmed to confirm signals from the pair of hand grip sensors indicative of the rider's two hands being on the pair of hand grips in order to determine that there is positive rider engagement.

4. The saddle-ride vehicle of claim 3, wherein the pair of hand grip sensors includes pressure transducers operable to detect a grip pressure applied to the pair of hand grips.

5. The saddle-ride vehicle of claim 1, further comprising at least one indicator operable to output a visual, auditory, or haptic alert to the rider in response to the identification of the autonomous braking event trigger.

6. The saddle-ride vehicle of claim 1, wherein the controller is programmed to determine that there is positive rider engagement only in response to both of: a report of positive rider cognition status from the rider cognition sensor and a report of positive rider physical engagement status from the rider physical sensor.

7. The saddle-ride vehicle of claim 1, further comprising an anti-lock braking system (ABS) operable to actuate to automatically maintain braking force on the brake at a threshold of wheel lock-up, wherein the controller is programmed to actuate the brake by an amount sufficient to trigger the ABS as the first level of autonomous actuation of the brake.

8. The saddle-ride vehicle of claim 7, wherein the controller is further programmed to automatically disengage a clutch of the vehicle in response to the instruction of the first level of autonomous actuation of the brake by the controller.

9. The saddle-ride vehicle of claim 1, further comprising at least one forward travel sensor including any one or more of: a camera, a RADAR sensor, and a LIDAR sensor in electrical communication with the controller and operable to identify a detrimental riding condition in a forward travel path of the vehicle as the autonomous braking event trigger.

10. The saddle-ride vehicle of claim 1, wherein the rider cognition sensor includes a camera operable to provide one or both of facial recognition of the rider and eye tracking of the rider.

11. The saddle-ride vehicle of claim 1, further comprising a hydraulic actuator electrically coupled to the controller and hydraulically coupled to the brake, wherein the controller is operable to actuate the hydraulic actuator to supply hydraulic fluid pressure to the brake for the autonomous actuation of the brake.

12. A method of controlling autonomous actuation of a brake on a saddle-ride vehicle, the method comprising:
   operating a rider sensor system including one or both of: a rider cognition sensor operable to detect parameters of rider cognition and to report rider cognition status to a controller, and a rider physical sensor operable to detect parameters of a physical engagement between a rider and the vehicle and to report rider physical engagement status to the controller;
   analyzing, with the controller, information from the rider sensor system and determining whether or not there is positive rider engagement;
   identifying, with the controller, a trigger for an autonomous braking event using the brake;
   on the condition of the controller determining from the rider sensor system that there is positive rider engagement, instructing, with the controller, a first level of autonomous actuation of the brake in response to identification of the autonomous braking event trigger; and
   in the absence of the controller determining from the rider sensor system that there is positive rider engagement, instructing, with the controller, a retarding or disabling of the instruction of the first level of autonomous actuation of the brake in response to the identification of the autonomous braking event trigger.

13. The method of claim 12, wherein the controller checks the rider sensor system to determine whether there is a positive rider engagement, in response to the identification of the autonomous braking event trigger.

14. The method of claim 12, wherein operating the rider sensor system includes checking for positive physical engagement of the rider with the rider physical sensor, including checking for signals from a pair of hand grip sensors indicative of the rider's two hands being on a pair of hand grips of the saddle-ride vehicle.

15. The method of claim 14, wherein the signals from the pair of hand grips are dependent upon a detection of at least a minimum threshold grip pressure exerted on the pair of hand grips.

16. The method of claim 12, further comprising outputting a visual, auditory, or haptic alert to the rider in response to the identification of the autonomous braking event trigger.

17. The method of claim 12, wherein the controller determines that there is positive rider engagement only in response to both of: positive rider cognition status and positive rider physical engagement status.

18. The method of claim 12, further comprising one or both of: actuating a momentary pulse of the brake or momentarily interrupting the delivery of drive power in response to the identification of the autonomous braking event trigger.

19. The method of claim 12, wherein the controller instructing the first level of autonomous actuation of the brake includes engaging an anti-lock braking system of the saddle-ride vehicle to maximize vehicle deceleration rate without wheel lock-up.

20. The method of claim 19, further comprising automatically disengaging a clutch of the vehicle with the controller during engagement of the anti-lock braking system.

21. The method of claim 12, wherein the autonomous braking event trigger is identified at least partially based on detection of a detrimental riding condition in a forward travel path of the vehicle using one or more of: a camera, a RADAR sensor, and a LIDAR sensor.

22. The method of claim 12, wherein the controller determines positive rider cognition status based on analysis of one or both of: facial recognition of the rider and eye tracking of the rider with a camera as the rider cognition sensor.

23. The method of claim 12, wherein the autonomous braking event trigger is identified at least partially based on GPS location data of a localized roadway or environmental condition reported to the controller.

* * * * *